(12) United States Patent
Zhang et al.

(10) Patent No.: US 9,699,761 B2
(45) Date of Patent: Jul. 4, 2017

(54) METHOD AND APPARATUS FOR SELECTING A POSITIONING SOLUTION

(75) Inventors: Yang Zhang, Shanghai (CN); Li Lv, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 143 days.

(21) Appl. No.: 14/126,830

(22) PCT Filed: Jun. 22, 2011

(86) PCT No.: PCT/CN2011/076135
§ 371 (c)(1),
(2), (4) Date: Dec. 16, 2013

(87) PCT Pub. No.: WO2012/174716
PCT Pub. Date: Dec. 27, 2012

(65) Prior Publication Data
US 2014/0128087 A1     May 8, 2014

(51) Int. Cl.
| | |
|---|---|
| H04W 72/00 | (2009.01) |
| H04W 24/00 | (2009.01) |
| H04W 64/00 | (2009.01) |
| G01S 1/72 | (2006.01) |
| H04W 72/04 | (2009.01) |
| G01S 19/25 | (2010.01) |
| G01S 19/42 | (2010.01) |

(Continued)

(52) U.S. Cl.
CPC .......... *H04W 64/006* (2013.01); *G01S 1/725* (2013.01); *G01S 5/0236* (2013.01); *G01S 5/0268* (2013.01); *G01S 19/25* (2013.01); *G01S 19/426* (2013.01); *H04W 72/044* (2013.01); *G01S 5/0063* (2013.01)

(58) Field of Classification Search
CPC ................................................... H04W 64/00
USPC .................................. 455/456.1–456.6, 450
See application file for complete search history.

(56) References Cited

U.S. PATENT DOCUMENTS

| | | | |
|---|---|---|---|
| 2003/0064735 A1* | 4/2003 | Spain .................... | G01S 5/0252 455/456.1 |
| 2006/0052115 A1* | 3/2006 | Khushu ................. | G01S 5/0263 455/456.3 |

(Continued)

FOREIGN PATENT DOCUMENTS

| | | |
|---|---|---|
| CN | 1988713 | 6/2007 |
| CN | 101317101 | 12/2008 |

(Continued)

OTHER PUBLICATIONS

PCT International Preliminary Report on Patentability (Chapter I) for PCT Counterpart Application No. PCT/CN2011/076135, (Jan. 9, 2014), 7 pages.

(Continued)

*Primary Examiner* — Kathy Wang-Hurst
*Assistant Examiner* — Said Elnoubi
(74) *Attorney, Agent, or Firm* — NDWE LLP

(57) ABSTRACT

Embodiments of the invention provide a method for selecting a positioning solution. The method includes receiving information of a channel allocated to a terminal, and selecting, based on the information of the channel, a solution from a set of positioning solutions for the terminal. The method of the present invention is robust and automatically adapts itself to different traffic scenarios.

23 Claims, 7 Drawing Sheets

(51) Int. Cl.
*G01S 5/02* (2010.01)
*G01S 5/00* (2006.01)

(56) References Cited

U.S. PATENT DOCUMENTS

| | | | |
|---|---|---|---|
| 2006/0135176 A1* | 6/2006 | Xiong | 455/456.1 |
| 2006/0212259 A1 | 9/2006 | Seibert | |
| 2007/0135131 A1* | 6/2007 | Ishii | H04L 12/5695 455/453 |
| 2009/0201898 A1* | 8/2009 | Gong | H04L 1/0007 370/338 |
| 2009/0310585 A1 | 12/2009 | Alizadeh-Shabdiz | |
| 2012/0315890 A1* | 12/2012 | Suzuki | H04W 24/10 455/422.1 |
| 2013/0028222 A1* | 1/2013 | Nakasato | 370/329 |

FOREIGN PATENT DOCUMENTS

| | | | | |
|---|---|---|---|---|
| EP | | 1785741 | 5/2007 | |
| EP | | 1785741 A1 * | 5/2007 | G01S 5/0263 |
| IT | WO 2006069597 A1 * | | 7/2006 | G01S 5/0036 |
| JP | | 2004040171 A | 2/2004 | |
| WO | WO-2006/069597 | | 7/2006 | |
| WO | WO 2006069597 A1 * | | 7/2006 | |
| WO | WO-2007018790 A1 | | 2/2007 | |

OTHER PUBLICATIONS

Extended European Search Report and Written Opinion, Application No. 11868413.3, dated Oct. 15, 2014, 6 pages.

PCT International Search Report for PCT Counterpart Application No. PCT/CN2011/076135, (Mar. 29, 2012), 3 pages.

"Base Station System Application Part LCS Extension (BSSAP-LE)," 3GPP TS 49.031 V8.1.0 (Dec. 2008), *3rd Generation Partnership Project; Technical Specification Group GSM/EDGE Radio Access Network; Location Services (LCS)*; (Release 8), (Dec. 2008), 52 pages.

"Changes to Stage II allowing Parallel positioning," GP-092337, TruePosition Inc., *Nokia Siemens Networks*, 3GPP TSG GERAN—Meeting #44, (Nov. 16-20, 2009), 3 pages.

"Functional stage 2 description of Location Services (LCS)", 3GPP TS 23.271 V11.2.0 (Mar. 2013); *3rd Generation Partnership Project; Technical Specification Group Services and System Aspects*; (Release 11), (Mar. 2013), 169 pages.

"Functional stage 2 description of Location Services (LCS) in GERAN," 3GPP TS 43.059 V8.1.0 (Aug. 2008); *3rd Generation Partnership Project; Technical Specification Group GSM/EDGE Radio Access Network*; (Release 8), (Aug. 2008), 69 pages.

"Mobile Station (MS)—Serving Mobile Location Centre (SMLC) Radio Resource LCS Protocol (RRLP)," 3GPP TS 44.031 V11.0.0 (Sep. 2012); *3rd Generation Partnership Project; Technical Specification Group GSM/EDGE Radio Access Network; Location Services (LCS)*; (Release 11), (Sep. 2012), 148 pages.

"Service description; Stage 1," 3GPP TS 22.071 V11.0.0 (Sep. 2012); *3rd Generation Partnership Project; Technical Specification Group Services and System Aspects; Location Services (LCS)*; (Release 11), (Sep. 2012), 50 pages.

"Serving Mobile Location Centre—Base Station System (SMLC-BSS) interface; Layer 3 specification", 3GPP TS 48.071 V9.3.0 (Sep. 2012); *3rd Generation Partnership Project; Technical Specification Group GSM/EDGE Radio Access Network; Location Services (LCS)*; (Release 9), (Sep. 2012), 23 pages.

* cited by examiner

МЕТHOD AND APPARATUS FOR
SELECTING A POSITIONING SOLUTION

CROSS-REFERENCE TO RELATED APPLICATIONS

This application is a National stage of International Application No. PCT/CN2011/076135, filed Jun. 22, 2011, which is hereby incorporated by reference.

TECHNICAL FIELD

Embodiments of the present invention generally relate to wireless communications, more particularly, to a method and apparatus for selecting a positioning solution.

BACKGROUND

Determination of geographic position of an object, equipment or a person carrying the equipment has become more and more interesting in many fields of application, particularly true within the field of wireless communication. Positioning systems and methods are increasing recent years. LoCation Service (LCS) and related protocols have been standardized by 2G mobile network protocols. By making use of the radio signal measurements, possibility to determine and report the (geographic) location of the mobile station (MS) also can be found in 3GPP standards, such as 3GPP TS 22.071, TS 23.271, TS 43.059, TS 49.031, TS 48.071 and TS 44.031.

Global Navigation Satellite System (GNSS) is a satellite system for positioning purposes. Systems belonging to this category, that are operational today or will be in the near future are, for example, Global Positioning System (GPS), Galileo, Satellite Based Augmentation Systems (SBAS), Modernized GPS, Quasi Zenith Satellite System (QZSS), GLONASS, etc. . . . .

A terminal with GNSS measurement capability may operate in an autonomous mode or in an assisted mode. In the autonomous mode, a terminal determines its position based on signals received from GNSS without assistance from network. For example, a Cell ID based positioning solution, which requires no assistance data, can be used by a terminal in the autonomous mode.

In the assisted mode, for example, a MS-assisted mode or a MS-based mode, a terminal receives assistance data from network. In the MS-assisted mode, a terminal provides position measurements to the network for computation of a location estimate by the network and the network may provide assistance data to the terminal to enable position measurements and/or improve measurement performance. While in the MS-based mode, a terminal performs both position measurements and computation of a location estimate and the network provides to the terminal assistance data useful or essential to one or both of these functions. Generally, a terminal in the MS-based mode needs more assistance data than one in the MS-assisted mode. In other words, a MS-based positioning solution requires more assistance data than a MS-based positioning solution.

It can be seen that, in the currently wireless positioning communication system, there are complicated scenarios and many different position solutions to be applied in those scenarios. If a position solution is improperly applied in a concrete scenario, the possibility of positioning failure will be highly increased and the positioning accuracy will be reduced. Therefore, how to select a position solution which is suitable for a concrete scenario is an important problem.

SUMMARY

In view of the foregoing, there is a need in the art to provide methods and apparatuses for selecting a positioning solution suitable for a concrete scenario.

According to a first aspect of the present invention, embodiments of the invention provide a method for selecting a positioning solution, comprising: receiving information of a channel allocated to a terminal; and selecting, based on the information of the channel, a solution from a set of positioning solutions for the terminal.

According to a second aspect of the present invention, embodiments of the invention provide an apparatus for selecting a positioning solution, comprising: a receiver, configured to receive information of a channel allocated to a terminal; and a selector, configured to select, based on the information of the channel, a solution from a set of positioning solutions for the terminal.

According to a third aspect of the present invention, embodiments of the invention provide a location server for selecting a positioning solution, comprising: at least one processor; and at least one memory storing program of computer executable code, wherein the computer executable code is configured, with the at least one processor, to cause the location server to perform any one of the methods for selecting a positioning solution according to the invention.

According to a fourth aspect of the present invention, embodiments of the invention provide an apparatus for use in terminal positioning, comprising: a transmitter, configured to transmit to a location sever information of a channel allocated to a terminal; and a notifier, configured to, in response to the location sever selecting a positioning solution based on the information of the channel, notify the terminal the selected positioning solution.

According to a fifth aspect of the present invention, embodiments of the invention provide an apparatus for use in positioning of a terminal, comprising: a receiver, configured to receive, from a base station controller, notification of a positioning solution selected by a location server based on information of a channel allocated to the terminal; and an executer, configured to position the terminal according to the selected positioning solution.

The following benefits can be expected with embodiments of the invention.

Selecting position solution based on information of a channel allocated to a terminal can make the schemes of the present invention automatically adapt itself to different traffic scenarios. This improves positioning success rate and make it less impacted by radio resource management which is now higher prioritized over LCS by a Base Station Controller (BSC) according to 3GPP specification. This is important for some services including emergency.

A more efficient positioning flow control reduces supervision effort in location sever, e.g., a Serving Mobile Location Center (SMLC).

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where.

DETAILED DESCRIPTION

Figure 1:
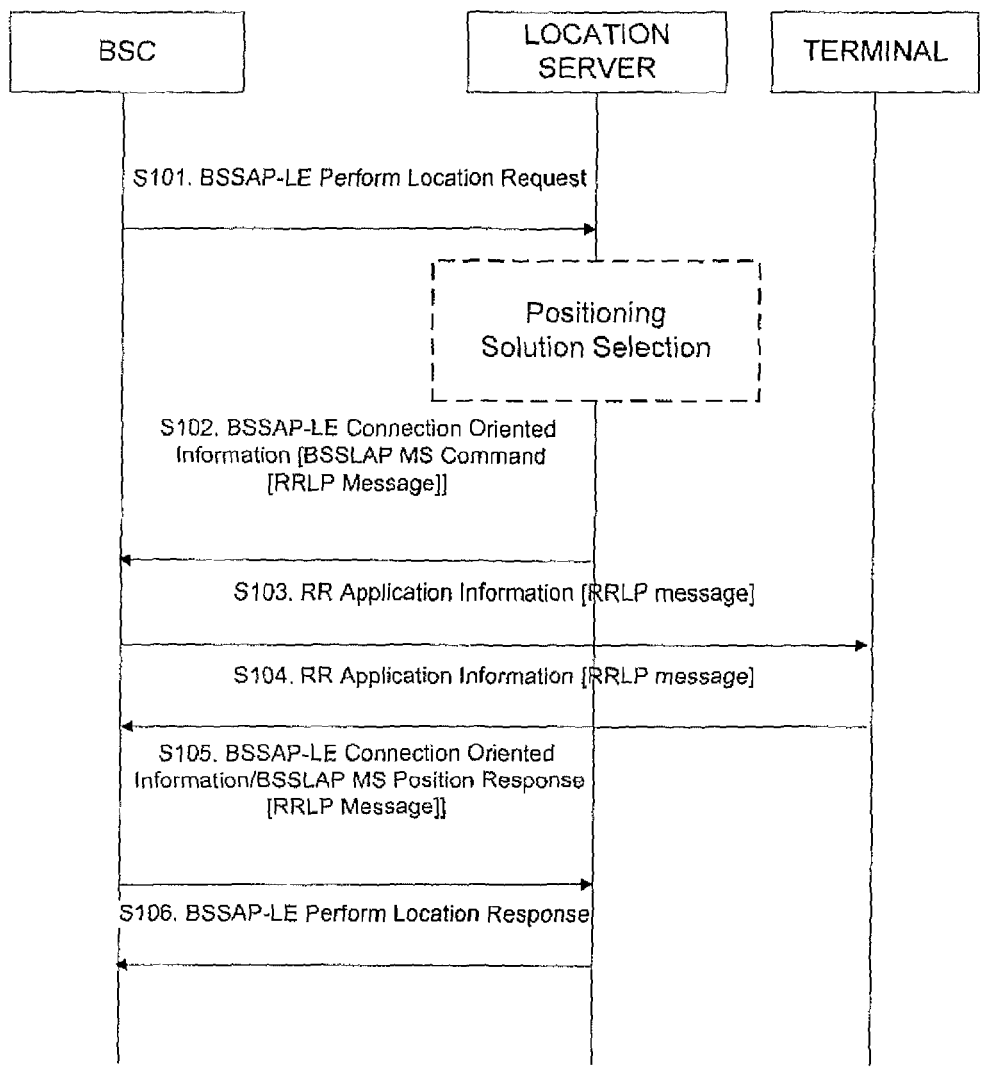
FIG. 1 illustrates a schematic diagram of typical positioning procedures in a wireless communication system, introducing the positioning solution selection according to an embodiment of the invention.

Various embodiments of the present invention are described in detail with reference to the drawings. The flowcharts and block diagrams in the figures illustrate the apparatus, method, as well as architecture, functions and operations executable by a computer program product according to the embodiments of the present invention. In this regard, each block in the flowcharts or block may represent a module, a program, or a part of code, which contains one or more executable instructions for performing specified logic functions. It should be noted that in some alternatives, functions indicated in blocks may occur in an order differing from the order as illustrated in the figures. For example, two blocks illustrated consecutively may be actually performed in parallel substantially or in an inverse order, which depends on related functions. It should also be noted that block diagrams and/or each block in the flowcharts and a combination of thereof may be implemented by a dedicated hardware-based system for performing specified functions/operations or by a combination of dedicated hardware and computer instructions.

An embodiment of the present invention discloses a method for selecting a positioning solution. In this method, information of a channel allocated to a terminal may be first received, and then a positioning solution may be selected from a set of positioning solutions for the terminal based on the received information. The information of a channel can include the channel mode or channel type, and/or the data rate of the channel.

In an embodiment of the invention, the positioning solution may be selected based on the size limit of assistance data calculated based on the information of the channel. In another embodiment of the invention, the positioning solution may be selected based on the size limit of assistance data and possibility of positioning failure. This method may be used in a location server, for example, Serving Mobile Location Center (SMLC), or any other applicable device.

An embodiment of the present invention discloses a method for use in terminal positioning. In this method, information of a channel allocated to a terminal may be transmitted to a location server; and the terminal may be notified the selected positioning solution in response to the location sever selecting a positioning solution based on the information of the channel. This method may be used in a base station controller (BSC), or any other applicable device.

An embodiment of the present invention discloses a method for use in positioning of a terminal. In this method, notification of a positioning solution selected by a location server based on information of a channel allocated to the terminal may be received from a base station controller; and then the terminal is positioned according to the selected positioning solution. This method may be used in a terminal, for example, a mobile phone, a personal digital assistant (PDA), a portable computer, and so on, or any other applicable device.

FIG. 1 illustrates a schematic diagram of typical positioning procedures in a wireless communication system, introducing the positioning solution selection according to an embodiment of the invention. The wireless communication system comprises a location server, a BSC and a terminal, which cooperates to position the terminal by employing a positioning solution.

The positioning procedures shown in FIG. 1 relate to an Assisted-GPS (AGPS) method which belongs to Global Positioning System (GPS) based methods. The typical procedures of an AGPS method are described as below.

At step S101, in response to receive a Base Station System Application Part (BSSAP) Perform Location Request message from MSC, BSC sends a BSSAP-Location Services (LCS) Extension (LE) Perform Location Request message to request a location server (SMLC) to start the positioning procedure.

At step S102, if a positioning method is determined, for example, the MS-based AGPS solution, the MS-assisted AGPS solution, or some other positioning solution, the location server passes a BSSAP-LE Connection Oriented Information message to BSC, and this message contains an embedded BSSLAP MS Position Command (wherein the BSSLAP MS Position Command is defined by 3GPP TS 08.71 with an Radio Resource Location Services Protocol (RRLP) message, to indicate the determined positioning solution.

At step S103, BSC transfers, such as through a base station, to the target terminal the embedded RRLP message inside an RR Application Information message. No later than when the Radio Resource (RR) Application Information message has been transferred, BSC starts a positioning supervision timer if none is already in progress or restart this if already in progress. If the timer expires before the final response in step S102 is received, BSC returns a BSSAP-LE Connection oriented Information message to the location server containing a BSSLAP Abort with a cause of BSC timeout.

At step S104, when the target terminal has positioning information to return to the location server, it sends, such as through a base station, to BSC an RR Application Information message. This message contains an embedded RRLP message.

At step S105, BSC forwards to the location server the RRLP message inside a BSSLAP MS Positioning Response message contained in a BSSAP-LE Connection Oriented Information message. If the location server indicated a positioning command in step S101 and the terminal has indicated a final response, BSC may add additional measurement information to the BSSLAP MS Position Response in the last BSSAP-LE message—if necessary, creating a new BSSAP-LE message if message size limitations would be exceeded.

At step S106, the location server sends a BSSAP-LE Perform Location Response message to BSC containing any location estimate (with optional velocity estimate) or deciphering keys. In case of failure, the cause value may be included. Then, BSC may send to MSC the BSSAP Perform Location Response message, including, for example, location estimate, velocity estimate, positioning data, deciphering keys, or LCS Cause.

The positioning solution selection can be implemented between steps S101 and S102. This selection can be done in location sever, for example, SMLC, to select a positioning solution more suitable for the current communication environment. This selection can be implemented in other time sequence, such as before step 1 if the information of the channel allocated to the terminal is not received from message in step 1. More details of the invention are shown in the embodiments of FIG. 2 and FIG. 3.

It should be noted that although embodiments above relates to Assisted Global Positioning System (AGPS), it is just an example, and this invention can be applicable to other position systems, methods or solutions. It also should be noted that location sever usually communicate with BSC, but it can be arranged to communicate with other nodes or devices in the network side. And, BSC may have different names in different systems, such as RNC in WCDMA system and eNodeB in LTE system.

Figure 2:
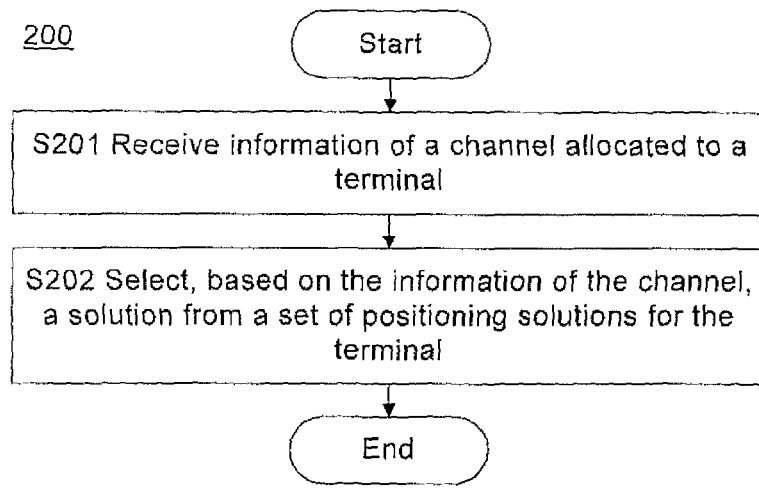
FIG. 2 illustrates a flow chart of a method for selecting a positioning solution according to another embodiment of the invention.
Figure 3:
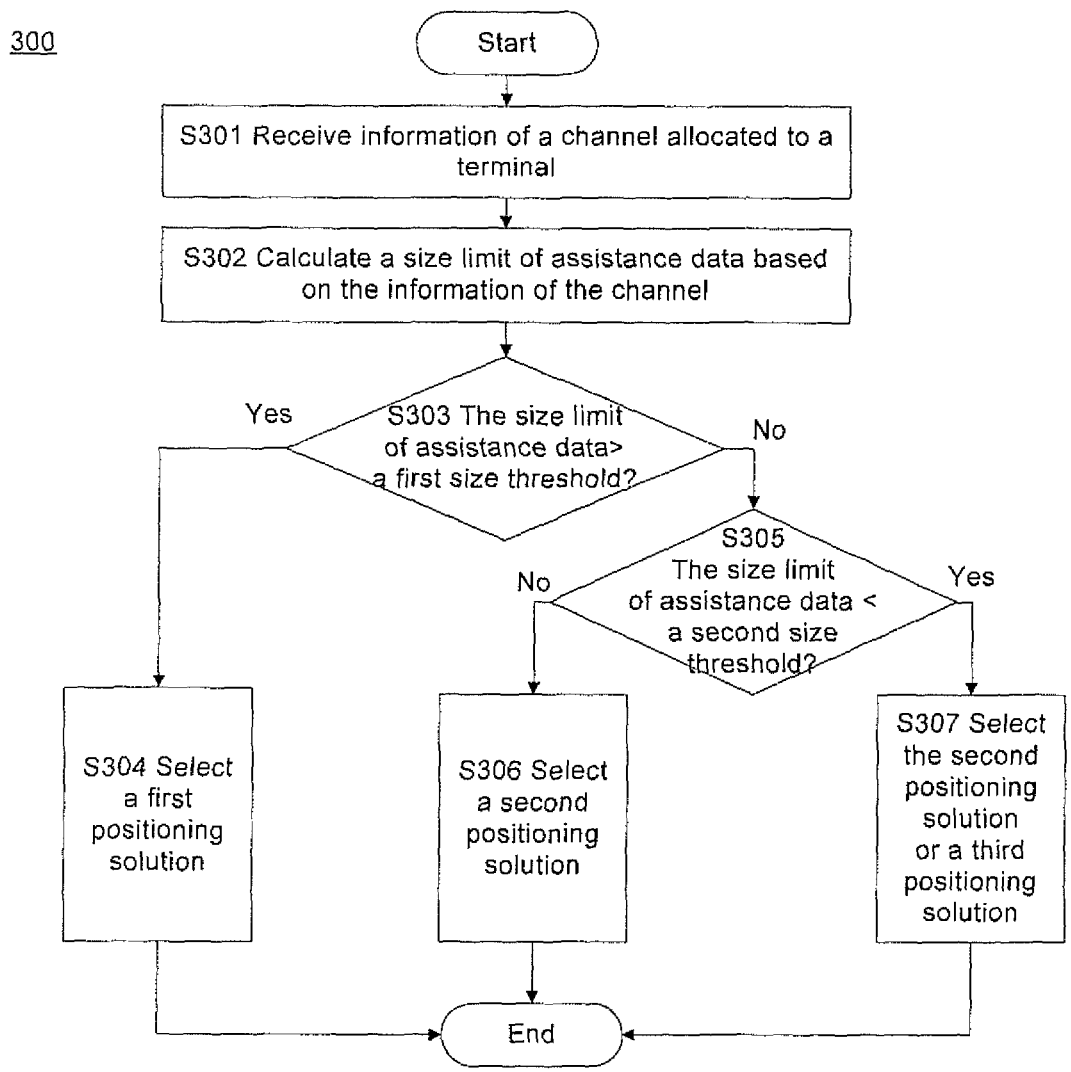
FIG. 3 illustrates a flow chart of a method for selecting a positioning solution according to another embodiment of the invention.

FIG. 2 illustrates a flow chart of a method for selecting a positioning solution according to another embodiment of the invention.

Assistance data for use in positioning is usually delivered over two types of channels, i.e., Standalone Dedicated Control Channel (SDCCH) and Fast Associated Control Channel (FACCH). The SDCCH is used for most short transactions, including initial call setup step, registration and SMS transfer. The SDCCH has a payload data rate of 0.782 kbit/s (see Table 1). The FACCH is always paired with a traffic channel. The FACCH is used for in-call signaling, including call disconnect, handover and the later stages of call setup. It has a payload data rate of 9.2 kbit/s when paired with a full-rate channel (FACCH/F) and 4.6 kbits when paired with a half-rate channel (FACCH/H) (see Table 1). Table 1 illustrates the correspondence of different modes of channels to respective data rates.

TABLE 1

Information of Channels

| Channel | Data rate |
|---|---|
| SDCCH | 782 bps |
| FACCH(FullRate) | 9200 bps |
| FACCH(HalfRate) | 4600 bps |

At step S201, information of a channel allocated to a terminal is received.

The channel allocated to a terminal may be a SDCCH, a FACCH, or some other channels. The information of a channel allocated to a terminal may indicate the channel mode or channel type, such as SDCCH, FACCH, or some other channel mode. Based on the channel mode, the data rate which corresponds to the channel can be found out by means of Table 1. This table can be placed in location server or any other suitable devices.

In an embodiment of the invention, the channel information may be received from BSSAP LE Perform Location Request message of step S101. In another embodiment of the invention, the channel information may be received from U-TDOA Response message sent by BSC.

As can be appreciated by those skilled in the art, there may be other channel mode suitable for terminal positioning, which are omitted here for the purpose of brief, and the SDCCH or the FACCH is only an example for illustration.

At step S202, a solution is selected from a set of positioning solutions for the terminal based on the information of the channel.

The set of positioning solutions may comprise one or more positioning solutions, such as the MS-based AGPS solution, the MS-assisted AGPS solution, the Cell ID based positioning solution, and so on.

In an embodiment of the invention, step S202 may be implemented by calculating a size limit of assistance data based on the information of the channel; and selecting the solution based on the size limit of assistance data, wherein the size of assistance data may be calculated based on the information of the channel. This embodiment will be described in detail in FIG. 3.

In another embodiment of the invention, step S202 may be implemented by selecting the solution based on a size limit of assistance data and possibility of positioning failure, wherein the size of assistance data may be calculated based on the information of the channel. This embodiment will be described in detail in FIG. 4.

As can be appreciated by a skilled in the art, many other suitable means may be adopted and the above embodiments illustrated herein are only shown as examples rather than limitation.

FIG. 3 illustrates a flow chart of a method for selecting a positioning solution according to another embodiment of the invention. In this embodiment, a size limit of assistance data is calculated based on the information of the channel.

At step S301, information of a channel allocated to a terminal is received.

The information may be received at step S301 in a similar way as at step S201. In an embodiment of the invention, the channel allocated to a terminal may be a SDCCH, a FACCH, or some other channel known in the art. The information of a channel allocated to a terminal may indicate the channel mode, such as SDCCH, FACCH, or some other channel mode known in the art. Based on the channel mode, the data rate which corresponds to the channel may be found out by means of Table 1.

At step S302, a size limit of assistance data is calculated based on the information of the channel.

In an example, the size limit of assistance data is calculated based on the data rate of the channel. First, data rate (denoted as "R") corresponding to the channel and some other parameters, such as response time (denoted as "Tr") and measurement time (denoted as "Te"), are obtained. The response time Tr usually indicates the time period for the terminal to make response. The measurement time Te usually indicates the time period for the terminal to do measurement. The data rate R corresponding to the channel can be obtained based on the information of the channel, such as based on the table 1. Then, the size limit of assistance data can be calculated based on the response time Tr, the measurement time Te and the data rate R corresponding to the channel. For example, the size limit (denoted as "Q") may be obtained based on equation (1) as below.

$$Q=(Tr-Te)\times R \quad (1)$$

Note the response time Tr may be received from a BSC or any other suitable device, or may be estimated by the location sever. Similarly, the measurement time Te may be received from a BSC or any other suitable device, or may be estimated by the location sever.

Besides the above parameters, other applicable parameters may be used in the calculation of the size limit. In another embodiment of the invention, besides the response time Tr, the measurement time Te and the data rate corresponding to the channel, protect margin time (denoted as "Tp") and uplink message transmission time (denoted as "Tul") may be also obtained. The protect margin time Tp may include time period for message processing, time uncertainty for downlink and uplink Radio Resource Control (RRC) message delivery over control channel, and time uncertainty for the terminal to do measurement. The uplink message transmission time Tul may indicate the time period for receiving the response from the terminal. Then, the size limit of assistance data may be calculated based on the response time Tr, the measurement time Te, the protect margin time Tp, the uplink message transmission time Tul and the data rate R. For example, the size limit Q may be obtained based on equation (2) as below.

$$Q=(Tr-Te-Tp-Tul)\times R \quad (2)$$

Note the protect margin time Tp may be received from a BSC or any other suitable device, or may be estimated by the location sever. Similarly, the uplink message transmission time Tul may be received from a BSC or any other suitable device, or may be estimated by the location sever.

As can be appreciated by those skilled in the art, the above embodiments are only for illustration rather than limitation. In practical applications, step S302 can be implemented in different ways, which are omitted here for the purpose of brief.

At step S303, whether the size limit of assistance data is larger than a first size threshold is judged.

The first size threshold (denoted as "Qb") indicates a predetermined threshold for assistance data size of a first positioning solution (such as MS-based AGPS solution). The first size threshold may be preset based on priori knowledge, or may be preset by one skilled in the art according to his/her preference or judgment, or may be set as a predefined value for a specific application scenario. For example, the first size threshold Qb for MS-based AGPS solution may be predefined as 4484 bits.

In this step, the size limit of assistance data Q is compared with the first size threshold Qb. If the size limit of assistance data is larger than the first size threshold, i.e., Q>Qb, the flow proceeds to step S304 to select a first positioning solution from the set of positioning solutions; if not, the flow proceeds to step S305 to perform further judgment. In an embodiment of the invention, the amount of assistance data suitable for the first positioning solution is larger than the first size threshold.

At step S304, a first positioning solution is selected from a set of positioning solutions.

In an embodiment of the invention, the first positioning solution may require large amount of assistance data and may be, for example, the MS-based AGPS solution predefined in the set of positioning solutions.

In an embodiment of the invention, after the first positioning solution is selected, the difference between the size limit of assistance data and the first size threshold may be calculated. Then, the difference may be compared with a data amount threshold. The data amount threshold is used to evaluate whether more data is to be sent to the terminal. If the difference is larger than the data amount threshold, the amount of assistance data to be sent to the terminal may be increased. Thus, the location server (for example, SMLC) may have the option to send more optional assistance data in case Q is larger than Qb, in order to ensure that the assistance data is adequate for the terminal to perform positioning. For example, in case of an emergency location request, if SMLC detects that a channel (TCH) has been allocated (emergency call can be ongoing during emergency request), SMLC has the option to send navigation model of as many as possible satellites for MS-based positioning over FACCH. Due to the high data rate essence of FACCH (accompanies the TCH), the data size increase will have very limited impact on the delivery time while can ensure that terminal can proceed the positioning without further assistance data request towards SMLC.

At step S305, whether the size limit of assistance data is less than the second size threshold is judged.

The second size threshold (denoted as "Qa") indicates a predetermined threshold for assistance data size of a second positioning solution (such as MS-assisted AGPS solution). The second size threshold may be preset based on priori knowledge, or may be preset by one skilled in the art according to his/her preference or judgment, or may be set as a predefined value for a specific application scenario. For example, the second size threshold Qa for MS-assisted AGPS solution may be predefined as 724 bits.

In this step, the size limit of assistance data Q may be further compared with the second size threshold Qa. If the size limit of assistance data is not less than the second size threshold, i.e., Qa≤Q≤Qb, the flow proceeds to step S306 to select a second positioning solution from the set of positioning solutions; if not, i.e., Q<Qa, the flow proceeds to step S307. In an embodiment of the invention, the amount of assistance data suitable for the second positioning solution may be not larger than the first size threshold and not less than the second size threshold.

At step S306, a second positioning solution is selected from a set of positioning solutions.

In an embodiment of the invention, the second positioning solution may require less amount of assistance data than the first positioning solution. For example, when the first positioning solution is the MS-based AGPS solution, the second positioning solution may be the MS-assisted AGPS solution predefined in the set of positioning solutions.

At step S307, the second positioning solution or a third positioning solution is selected from a set of positioning solutions.

In an embodiment of the invention, the third positioning solution requires no assistance data or less amount of assistance data than the second positioning solution. For example, when the first positioning solution is the MS-based AGPS solution and the second positioning solution is the MS-assisted AGPS solution, the third positioning solution may be the Cell ID based positioning solution predefined in the set of positioning solutions. For another example, the third positioning solution may be some other positioning solution, such as Cell based positioning method, uplink time difference of arrival (UTDOA), enhanced observed time difference (E-OTD), observed time difference of arrival (OTDOA), etc., which requires no/less amount of data delivery over air interface than the second positioning solution. In an embodiment, at this step, what is selected may the MS-assisted AGPS solution or the Cell ID based positioning solution.

By implementing the embodiment of FIG. 3, a positioning solution can be selected intellectually based on the size limit of assistance data, which is obtained based on the information of the channel, so that the positioning accuracy and possibility of success are substantially improved.

Figure 4:
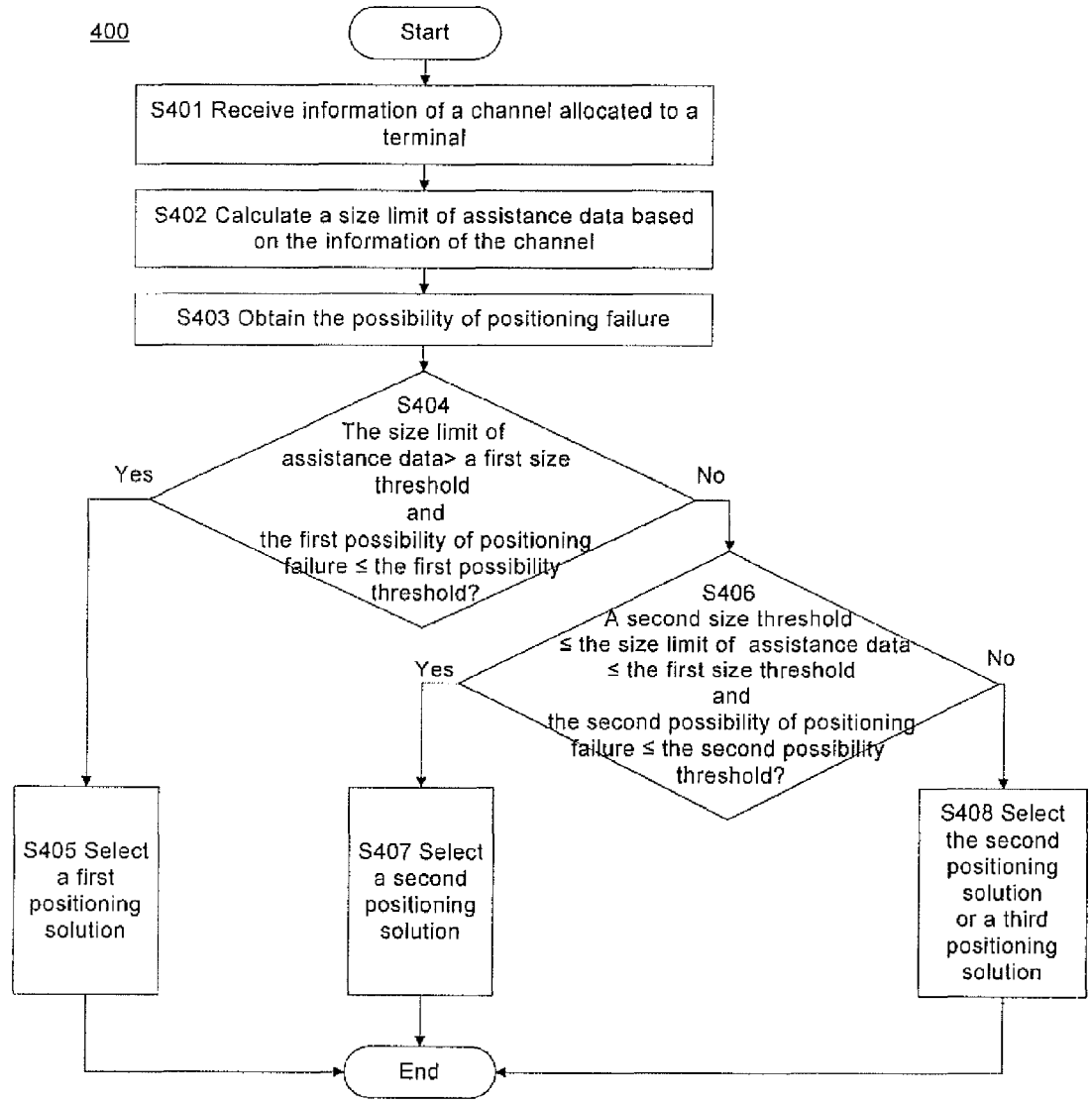
FIG. 4 illustrates a flow chart of a method for selecting a positioning solution according to yet another embodiment of the invention.

FIG. 4 illustrates a flow chart of a method for selecting a positioning solution according to yet another embodiment of the invention. In this embodiment, a solution is selected based on a size limit of assistance data and possibility of positioning failure, wherein the size of assistance data is calculated based on the information of the channel.

At step S401, information of a channel allocated to a terminal is received.

The information may be received at step S301 in a similar way as at step S201 or step S301, which is omitted here for the purpose of brief.

At step S402, a size limit of assistance data is calculated based on the information of the channel.

The size limit of assistance data may be received at step S402 in a similar way as at step S302, which is omitted here for the purpose of brief.

At step S403, the possibility of positioning failure is obtained.

The possibility of positioning failure refers to the collection of possibilities of failures of various positioning solutions. For example, the possibility of positioning failure may be the possibility of failure of the first positioning solution, referred as a first possibility of positioning failure (referred as "Pb"); the possibility of positioning failure may be the possibility of failure of the second positioning solution, referred as a second possibility of positioning failure (referred as "Pa"); and the possibility of positioning failure may be the possibility of failure of the third positioning solution, or some other possibility of failure useful in terminal positioning. For another example, the possibility of positioning failure may comprise both the first possibility of positioning failure and the second possibility of positioning failure, or comprise many other possibilities of positioning failure.

In another embodiment, the possibility of the AGPS failure due to handover and/or the possibility of the occurrence of handover during AGPS procedure may also be considered for selecting a positioning solution. Such possibilities may be cell specific. Because the serving-cell is always known before an AGPS attempt (rough position estimate is needed for AGPS assistance data calculation or terminal's location reference), such possibilities for serving cell can be extracted from a database by looking-up the serving cell ID. Therefore, for a cell with high AGPS failure rate or high handover possibility during AGPS, AGPS should not be attempted at all or, at least, MS-based should not be selected as positioning method which normally takes a long time to deliver assistance data and also perform measurement.

The possibilities of positioning failure may be obtained by several ways. In an embodiment of the invention, if an AGPS attempt fails due to inter-BSC Handover or intra-BSC Handover, a database may be updated to record the accumulated number of inter-BSC and intra-BSC Handover in that cell (the cell where terminal located when AGPS flow was initiated) and also the accumulated number of AGPS attempts in that cell. After each AGPS positioning, positioning status such as failure cause can be used to populate the database and aggregate cell specific statistics. For each cell, below information may be recorded in database:

1. The total number of MS-assisted AGPS(Na) and MS-based AGPS (Nb) attempts; and 2. The total number of failures of MS-assisted AGPS (Nfa) and MS-based AGPS (Nth) due to handover (inter-BSC or intra-BSC handover or both).

In this embodiment, the possibility of MS-assisted AGPS failure (Pa) and the possibility of MS-based AGPS failure (Pb) may be obtained as equations (3) and (4), respectively:

$$Pa=Nfa/Na \quad (3)$$

$$Pb=Nfb/Nb \quad (4)$$

At step S404, whether the size limit of assistance data is larger than a first size threshold is judged and whether the first possibility of positioning failure is not larger than (i.e., less than or equal to) the first possibility threshold is judged.

In an embodiment of the invention, the size limit of assistance data may be compared with a first size threshold (for example, Qb), and comparing a first possibility of positioning failure with a first possibility threshold. (for example, F1). The first size threshold indicates a predetermined threshold for assistance data size of a first positioning solution. The first possibility of positioning failure indicates the possibility of failure of a first positioning solution. If the size limit of assistance data is larger than the first size threshold and if the first possibility of positioning failure is not larger than the first possibility threshold, i.e., Q>Qb and Pb≤F1, the flow proceeds into step S405 to select the first positioning solution from the set of positioning solutions; if not, the flow proceeds to step S406 to perform further judgment. In this embodiment, the first positioning solution may require large amount of assistance data.

The first possibility threshold F1 may be preset based on priori knowledge, or may be preset by one skilled in the art according to his/her preference or judgment, or may be set as a predefined value for a specific application scenario, At step S405, a first positioning solution is selected from a set of positioning solutions.

In an embodiment of the invention, the first positioning solution may require large amount of assistance data and may be, for example, the MS-based AGPS solution predefined in the set of positioning solutions. In an embodiment of the invention, the amount of assistance data suitable for the first positioning solution is larger than the first size threshold.

In an embodiment of the invention, after the first positioning solution is selected, the difference between the size limit of assistance data and the first size threshold may be calculated. Then, the difference may be compared with a data amount threshold, the data amount threshold used to evaluate whether more data is to be sent to the terminal. If the difference is larger than the data amount threshold, the amount of assistance data to be sent to the terminal may be increased.

At step S406, whether the size limit of assistance data is not larger than (i.e., less than or equal to) the first size threshold and not less than (i.e., larger than or equal to) the second size threshold is judged, and whether the second possibility of positioning failure is not larger than (i.e., less than or equal to) the second possibility threshold is judged.

In an embodiment of the invention, the size limit of assistance data may be further compared with a second size threshold (for example, Qa), and comparing a second possibility of positioning failure with a second possibility threshold (for example, F2), wherein the second size threshold is less than the first size threshold. The second size threshold indicates a predetermined threshold for assistance data size of a second positioning solution. The second possibility of positioning failure indicates the possibility of failure of a second positioning solution. If the size limit of assistance data is not larger than the first size threshold and not less than the second size threshold, and if the second possibility of positioning failure is not larger than the second possibility threshold, i.e., Qa≤Q≤Qb and Pa≤F2, the flow proceeds into step S407 to select a second positioning solution from the set of positioning solutions; if not, the flow proceeds to step S408. In this embodiment, the second positioning solution may require less amount of assistance data than the first positioning solution.

The second possibility threshold (F2) may be preset based on priori knowledge, or may be preset by one skilled in the art according to his/her preference or judgment, or may be set as a predefined value for a specific application scenario.

At step S407, a second positioning solution is selected from a set of positioning solutions.

In an embodiment of the invention, the second positioning solution may require less amount of assistance data than the first positioning solution. For example, when the first positioning solution is the MS-based AGPS solution, the second positioning solution may be the MS-assisted AGPS solution predefined in the set of positioning solutions. In an embodiment of the invention, the amount of assistance data suitable for the second positioning solution may be not larger than the first size threshold and not less than the second size threshold.

At step S408, the second positioning solution or a third positioning solution is selected from a set of positioning solutions.

In an embodiment of the invention, the second positioning solution or a third positioning solution may be selected from the set of positioning solutions under the following situations: if the size limit of assistance data is less than the second size threshold; or, if the possibility of the first possibility of positioning failure is larger than the first possibility threshold; or, if the possibility of the second possibility of positioning failure is larger than the second possibility threshold; or, if the size limit of assistance data is larger than the first size threshold and if the second possibility of positioning failure is not larger than the second possibility threshold; or, if the size limit of assistance data is not larger than the first size threshold and not less than the second size threshold, and if the first possibility of positioning failure is not larger than the first possibility threshold.

In other words, when a first condition is defined as that the size limit of assistance data is larger than the first size threshold, while the first possibility of positioning failure is not larger than the first possibility threshold, and a second condition is defined as that the size limit of assistance data is not larger than the first size threshold and not less than the second size threshold, while the second possibility of positioning failure is not larger than the second possibility threshold. If neither the first condition nor the second condition can be met, the second positioning solution or the third positioning solution may be selected from the set of positioning solutions.

In an embodiment of the invention, the third positioning solution requires no assistance data. For example, when the first positioning solution is the MS-based AGPS solution and the second positioning solution is the MS-assisted AGPS solution, the third positioning solution may be the Cell ID based positioning solution predefined in the set of positioning solutions. In an example, at this step, what is selected may the MS-assisted AGPS solution or the Cell ID based positioning solution.

By implementing the embodiment of FIG. 4, a positioning solution can be selected intellectually based on the size limit of assistance data and possibility of positioning failure, so that the positioning accuracy and possibility of success are further improved.

It should be noted that there is no strict time sequence for these steps. For example, S403 can be happened before s401 or s402, or at the same time as S401 or S402.

Figure 5:
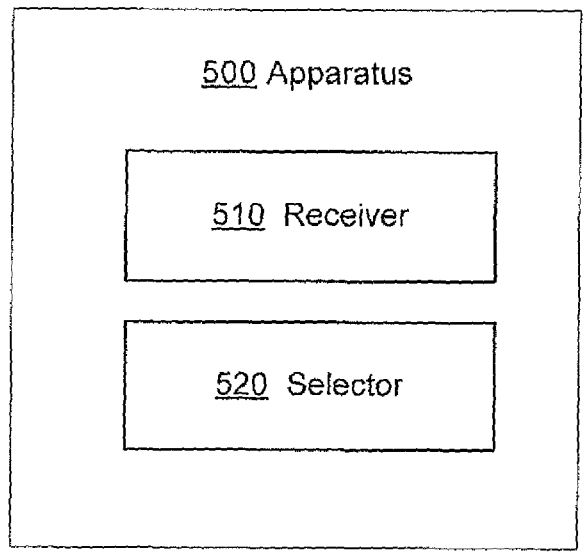
FIG. 5 illustrates block diagrams of an apparatus for selecting a positioning solution according to an embodiment of the invention.

FIG. 5 illustrates block diagrams of an apparatus 500 for selecting a positioning solution according to an embodiment of the invention.

In an embodiment of the invention, the apparatus 500 may comprise: a receiver 510, configured to receive information of a channel allocated to a terminal; and a selector 520, configured to select, based on the information of the channel, a solution from a set of positioning solutions for the terminal.

In an embodiment of the invention, the selector (520) may comprise: a calculator, configured to calculate a size limit of assistance data based on the information of the channel; and a selecting unit, configured to select the solution based on the size limit of assistance data.

In an embodiment of the invention, the calculator of the selector 520 may comprise: a first parameter obtaining unit, configured to obtain response time (Tr), measurement time (Te), and data rate corresponding to the channel, wherein the response time (Tr) indicates the time period for the terminal to make response, the measurement time (Te) indicates the time period for the terminal to do measurement, and the data rate corresponding to the channel is obtained based on the information of the channel; and a size limit calculating unit, configured to calculate a size limit of assistance data based on the response time (Tr), the measurement time (Te) and the data rate corresponding to the channel.

In an embodiment of the invention, the size limit calculating unit of the calculator of the selector 520 may further comprise: a second parameter obtaining unit, configured to obtain protect margin time (Tp) and uplink message transmission time (Tul), wherein the protect margin time (Tp) includes time period for message processing, time uncertainty for downlink and uplink RRC message delivery over control channel, and time uncertainty for the terminal to do measurement, and wherein the uplink message transmission time (Tul) indicates the time period for receiving the response from the terminal. The size limit calculating unit may be further configured to calculate a size limit of assistance data based on the response time (Tr), the measurement time (Te), the protect margin time (Tp), the uplink message transmission time (Tul) and the data rate corresponding to the channel.

In an embodiment of the invention, the selecting unit of the selector (520) may further configured to compare (S303) the size limit of assistance data with a first size threshold, and if the size limit of assistance data is larger than the first size threshold, to select a first positioning solution from the set of positioning solutions, wherein the first size threshold indicates a predetermined threshold for assistance data size of the first positioning solution. For example, the selecting unit may comprise: a comparator, configured to compare the size limit of assistance data with a first size threshold; and a decision unit, configured to, if the size limit of assistance data is larger than the first size threshold, select a first positioning solution from the set of positioning solutions, wherein the first positioning solution requires large amount of assistance data.

In an embodiment of the invention, the selecting unit, such as the comparator of the selecting unit, may be further configured to compare the size limit of assistance data with a second size threshold, the second size threshold being less than the first size threshold. The decision unit of the selecting unit of the selector 520 is further configured to, if the size limit of assistance data is not larger than a first size threshold and not less than the second size threshold, select a second positioning solution from the set of positioning solutions, wherein the second size threshold indicates a predetermined threshold for assistance data size of the second positioning solution, and wherein the second positioning solution requires less amount of assistance data than the first positioning solution.

In an embodiment of the invention, the selecting unit, such as the decision unit of the selecting unit, may be further configured to, if the size limit of assistance data is less than the second size threshold, select the second positioning solution or a third positioning solution from the set of positioning solutions, wherein the third positioning solution requires no assistance data.

In an embodiment of the invention, the selector 520 may comprise: a selecting unit, configured to select the solution based on a size limit of assistance data and possibility of positioning failure, wherein the size of assistance data is calculated based on the information of the channel.

In an embodiment of the invention, the selecting unit of the selector 520 may comprise: a comparator, configured to compare the size limit of assistance data with a first size threshold, and compare a first possibility of positioning failure with a first possibility threshold; and a decision unit, configured to, if the size limit of assistance data is larger than the first size threshold and if the first possibility of positioning failure is not larger than the first possibility threshold, select a first positioning solution from the set of positioning solutions, wherein the first size threshold indicates a predetermined threshold for assistance data size of the first positioning solution, and wherein the first possibility of positioning failure indicates the possibility of failure of the first positioning solution.

In an embodiment of the invention, the comparator of the selecting unit of the selector 520 is further configured to compare the size limit of assistance data with a second size threshold, and compare a second possibility of positioning failure with a second possibility threshold, wherein the second size threshold is less than the first size threshold. The decision unit of the selecting unit of the selector 520 is further configured to, if the size limit of assistance data is not larger than the first size threshold and not less than the second size threshold, and if the second possibility of positioning failure is not larger than the second possibility threshold, selecting a second positioning solution from the set of positioning solutions, wherein the second positioning solution requires less amount of assistance data than the first positioning solution, wherein the second size threshold indicates a predetermined threshold for assistance data size of the second positioning solution, and wherein the second possibility of positioning failure indicates the possibility of failure of the second positioning solution.

In an embodiment of the invention, the decision unit of the selecting unit of the selector 520 is further configured to select the second positioning solution or a third positioning solution from the set of positioning solutions, wherein the third positioning solution requires no assistance data, if the size limit of assistance data is less than the second size threshold; or if the possibility of the first possibility of positioning failure is larger than the first possibility threshold; or if the possibility of the second possibility of positioning failure is larger than the second possibility threshold; or if the size limit of assistance data is larger than the first size threshold and if the second possibility of positioning failure is not larger than the second possibility threshold; or if the size limit of assistance data is not larger than the first size threshold and not less than the second size threshold, and if the first possibility of positioning failure is not larger than the first possibility threshold.

In an embodiment of the invention, the first positioning solution is MS-based AGPS solution, the second positioning solution is MS-assisted AGPS solution, and the third positioning solution is Cell ID based positioning solution.

In an embodiment of the invention, the decision unit of the selecting unit of the selector 520 may comprise: a difference calculating unit, configured to calculate the difference between the size limit of assistance data and the first size threshold; a difference comparing unit, configured to compare the difference with a data amount threshold, the data amount threshold used to evaluate whether more data is to be sent to the terminal.; and an adjustor, configured to, if the difference is larger than a data amount threshold, increase the amount of assistance data to be sent to the terminal.

It should be noted that the apparatus 500 can be a location server (such as SMLC) or a part of a location server, or any other suitable device.

Figure 6:
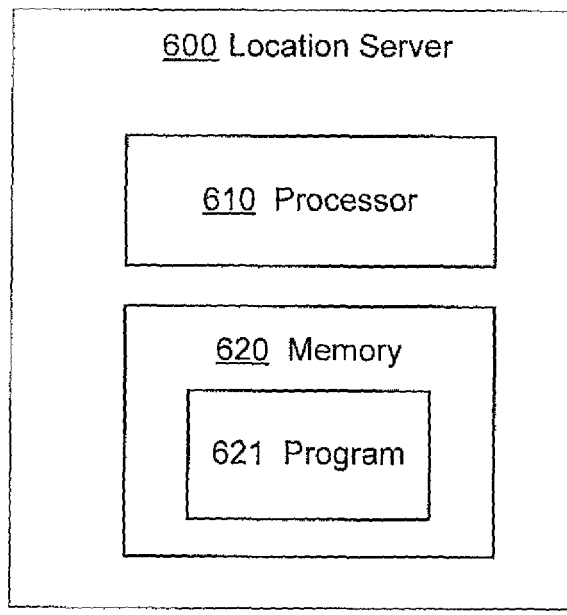
FIG. 6 illustrates block diagrams of a location server for selecting a positioning solution according to an embodiment of the invention.

FIG. 6 illustrates block diagrams of a location server 600 for selecting a positioning solution according to an embodiment of the invention.

In an embodiment of the invention, the location server 600 may comprise: at least one processor 610; and at least one memory 620 storing program 621 of computer executable code. The computer executable code is configured, with the at least one processor, to cause the location server 600 to perform the methods for selecting a positioning solution according to the embodiments of the present invention. For example, the methods illustrated in FIGS. 2-4 may be implemented by the location server 600.

Figure 7:
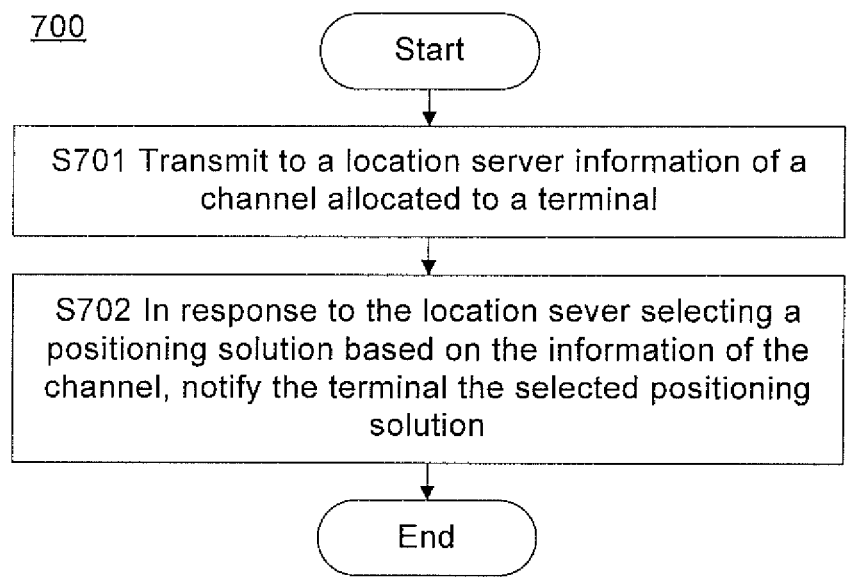
FIG. 7 illustrates a flow chart of a method for use in terminal positioning according to an embodiment of the invention.

FIG. 7 illustrates a flow chart of a method 700 for use in terminal positioning according to an embodiment of the invention. This method may be performed by a base station controller 900, which is described as blow.

At step S701, a base station controller transmits information of a channel allocated to a terminal to a location server, for example, location sever 600.

At step S702, in response to the location sever 600 selecting a positioning solution based on the information of the channel, the base station controller notifies the terminal the selected positioning solution.

Then, the flow of the embodiment of FIG. 7 ends up.

Figure 8:
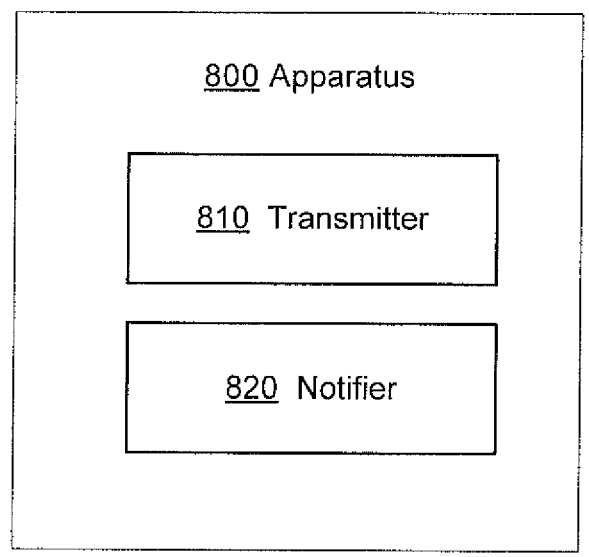
FIG. 8 illustrates block diagrams of an apparatus for use in terminal positioning according to an embodiment of the invention.

FIG. 8 illustrates block diagrams of an apparatus 800 for use in terminal positioning according to an embodiment of the invention.

In an embodiment of the invention, the apparatus 800 may comprise: a transmitter 810, configured to transmit to a location sever 600 information of a channel allocated to a terminal 1200; and a notifier 820, configured to, in response to the location sever 600 selecting a positioning solution based on the information of the channel, notify the terminal 1200 the selected positioning solution. The apparatus 800 can be a BSC or a part of a base station controller, or any other suitable device. It should be noted that BSC may have different names in different telecom systems.

Figure 9:
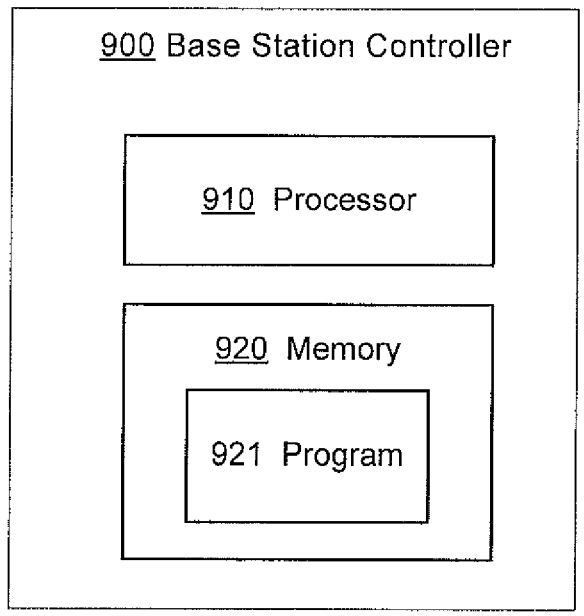
FIG. 9 illustrates block diagrams of a base station controller for use in terminal positioning according to an embodiment of the invention.

FIG. 9 illustrates block diagrams of a base station controller 900 for use in terminal positioning according to an embodiment of the invention.

In an embodiment of the invention, the base station controller 900 may comprise: at least one processor 910; and at least one memory 920 storing program 921 of computer executable code. The computer executable code is configured, with the at least one processor 910, to cause the base station controller 900 to at least: transmit to a location server 600 information of a channel allocated to a terminal 1200; and in response to the location sever 600 selecting a positioning solution based on the information of the channel, notify the terminal 1200 the selected positioning solution.

Figure 10:
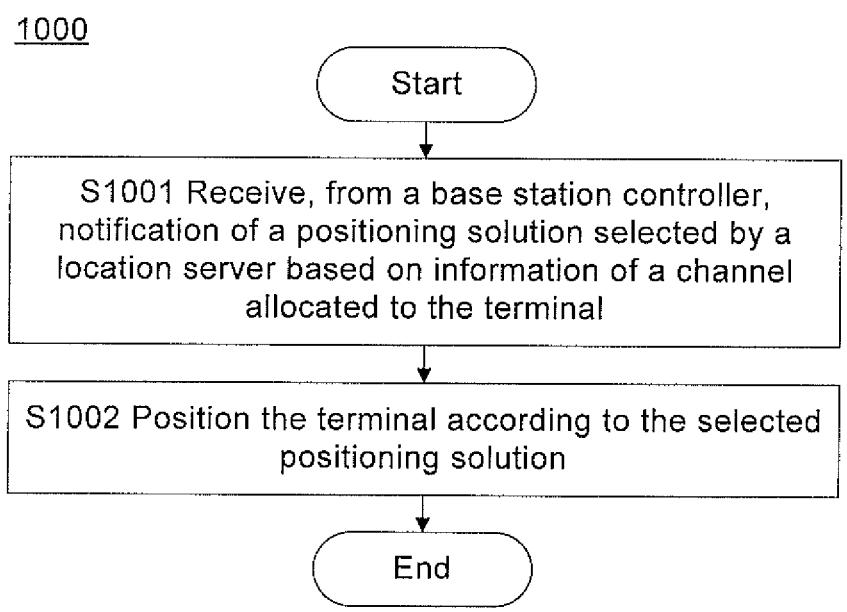
FIG. 10 illustrates a flow chart of a method for use in positioning of a terminal according to an embodiment of the invention.

FIG. 10 illustrates a flow chart of a method 1000 for use in positioning of a terminal according to an embodiment of the invention. This method may be performed by a terminal 1200, which is described as blow.

At step S1001, a terminal receives, from a base station controller 900, notification of a positioning solution selected by a location server 600 based on information of a channel allocated to the terminal.

At step S1002, the terminal is positioned according to the selected positioning solution.

Then, the flow of the embodiment of FIG. 10 ends up.

Figure 11:
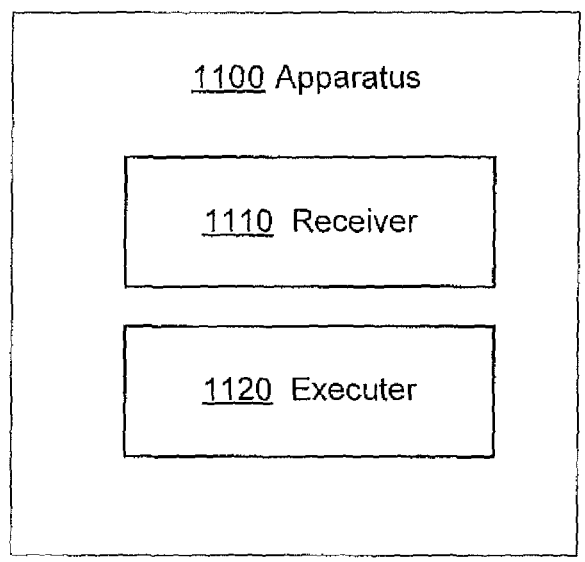
FIG. 11 illustrates block diagrams of an apparatus for use in positioning of a terminal according to an embodiment of the invention.

FIG. 11 illustrates block diagrams of an apparatus 1100 for use in positioning of a terminal according to an embodiment of the invention.

In an embodiment of the invention, the apparatus 1100 may comprise: a receiver 1110, configured to receive, from a base station controller 900, notification of a positioning solution selected by a location server 600 based on information of a channel allocated to the terminal; and an executer 1120, configured to position the terminal according to the selected positioning solution. The apparatus 1100 can be a terminal (such as a mobile station and a computer) or a part of a terminal.

Figure 12:
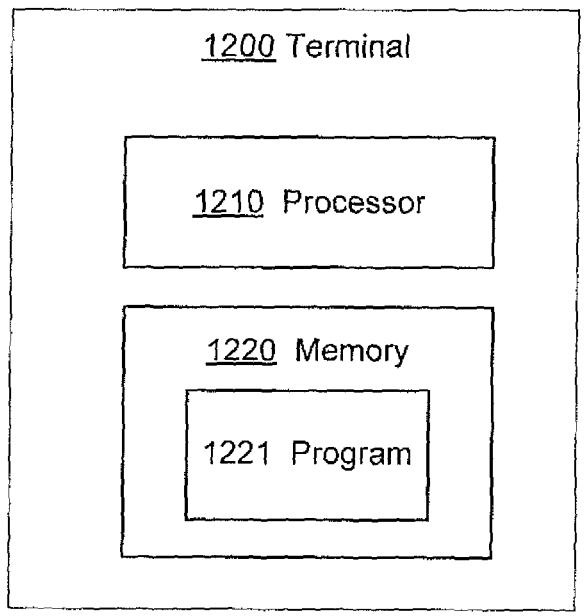
FIG. 12 illustrates block diagrams of a terminal for use in positioning of a terminal according to an embodiment of the invention.

FIG. 12 illustrates block diagrams of a terminal 1200 for use in positioning of a terminal according to an embodiment of the invention.

In an embodiment of the invention, the terminal 1200 may comprise: at least one processor 1210; and at least one memory 1220 storing program 1221 of computer executable code. The computer executable code is configured, with the at least one processor 1210, to cause the terminal to at least: receive, from a base station controller 900, notification of a positioning solution selected by a location server 600 based on information of a channel allocated to the terminal 1200; and position the terminal 1200 according to the selected positioning solution.

The present invention also relates to a wireless communication system. In an embodiment of the invention, the wireless communication system may comprise a location server 600, a base station controller 900 and a terminal 1200.

Although some embodiments of this invention are described under 2G telecom system, this invention can be applicable to other systems, such as WCDMA, TD-SCDMA and LTE.

Based on the above description, the skilled in the art would appreciate that the present invention may be embodied in methods, apparatuses, and a location sever/base station controller/terminal. The terminal in embodiments of this invention can be mobile station, but may not be limited to mobile station and can be other terminals, such as some devices with smart card. The present invention may be specifically implemented in the following manners, i.e., complete hardware, complete software (including firmware, resident software, microcode, etc), or a combination of software part and hardware part as generally called "circuit," "module," or "system" herein. Further, the present invention may also adopt a form of computer program product as embodied in any tangible medium of expression, the medium comprising computer-usable program code.

Any combination of one or more computer-usable or computer-readable mediums may be used. The computer-usable or computer-readable medium may be for example, but not limited to, electrical, magnetic, optical, electromagnetic, infrared, or semiconductor system, means, device, or propagation medium. More specific examples (non-exhaustive list) of the computer-readable medium comprise: an electric connection having one or more leads, a portable computer magnetic disk, hard disk, random access memory (RAM), read-only memory (ROM), erasable programmable read-only memory (EPROM or flash), optical fiber, portable compact disk read-only memory (CD-ROM), optical storage device, a transmission medium for example, supporting internet or intranet, or a magnetic storage device. It should be noted that the computer-usable or computer readable medium may even be a paper printed with a program thereon or other suitable medium, because the program may be obtained electronically by electrically scanning such paper or other medium, and then compiled, interpreted or processed in a suitable manner, and if necessary, stored in a computer memory. In the context of the present document, a computer-usable or computer-readable medium may be any medium containing, storing, communicating, propagating, or transmitting a program available for an instruction execution system, apparatus or device, or associated with the instruction execution system, apparatus, or device. A computer-usable medium may comprise a data signal contained in a base band or propagated as a part of carrier and embodying a computer-usable program code. A computer-usable program code may be transmitted by any suitable medium, including, but not limited to, radio, wire, cable, or RF, etc.

A computer program code for executing operations of the present invention may be written by any combination of one or more program design languages, the program design languages including object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, including local area network (LAN) or wide area network (WAN), or connected to external computer (for example, by means of an internet service provider via Internet).

Further, each block in the flow charts and/or block diagrams of the present invention and combination of respective blocks therein may be implemented by computer program instructions. These computer program instructions may be provided to a processor of a general purpose computer, a dedicated computer or other programmable data processing apparatus, thereby generating a machine such that these instructions executed through the computer or other programmable data processing apparatus generate means for implementing functions/operations prescribed in the blocks of the flow charts and/or block diagrams.

These computer program instructions may also be stored in a computer-readable medium capable of instructing the computer or other programmable data processing apparatus to work in a particular manner, such that the instructions stored in the computer-readable medium generate a product including instruction means for implementing the functions/operations prescribed in the flow charts and/or block diagrams.

The computer program instructions may also be loaded on a computer or other programmable data processing apparatus, such that a series of operation steps are implemented on the computer or other programmable data processing apparatus, to generate a computer-implemented process, such that execution of the instructions on the computer or other programmable apparatus provides a process of implementing the functions/operations prescribed in the blocks of the flow charts and/or block diagrams.

Though the exemplary embodiments of the present invention are described herein with reference to the drawings, it should be understood that the present invention is not limited to these accurate embodiments, and a person of normal skill in the art can make various modifications to the embodiments without departing from the scope and principle of the present invention. All such variations and modifications are intended to be included in the scope of the present invention as defined in the appended claims.

What is claimed is:

1. A method for selecting a positioning solution, the method comprising:
   receiving information of a channel allocated to a terminal for wireless communication with the terminal, wherein the information pertains to a data transfer characteristic of the channel;
   determining a size limit of assistance data that can be transmitted over the channel, based on the information of the channel; and
   selecting a first positioning solution from a set of positioning solutions, when the size limit of assistance data determined for the channel is greater than a first size threshold and selecting a second positioning solution from the set of positioning solutions, when the size limit of assistance data is not greater than the first size threshold, but is not less than a second size threshold,
   wherein the first positioning solution is mobile station (MS) based Assisted Global Positioning System (AGPS) solution and the second positioning solution is MS-assisted AGPS solution.

2. The method of claim 1, wherein selecting the first positioning solution or the second positioning solution from the set of positioning solutions for the terminal comprises:
   calculating the size limit of assistance data based on the information of the channel; and
   selecting the first positioning solution or the second positioning solution based on comparing the size limit of assistance data calculated to the size thresholds.

3. The method of claim 2, wherein the calculating the size limit of assistance data based on the information of the channel comprises:
   obtaining a response time, a measurement time, and a data rate corresponding to the channel, wherein the response time indicates a time period for the terminal to make a response, the measurement time indicates a time period for the terminal to perform a measurement, and the data rate corresponding to the channel is obtained from the data transfer characteristic; and
   calculating the size limit of assistance data based on the response time, the measurement time, and the data rate corresponding to the channel.

4. The method of claim 3, wherein the calculating the size limit of assistance data based on the response time, the measurement time, and the data rate corresponding to the channel further comprises:
   obtaining a protect margin time and a uplink message transmission time, wherein the protect margin time includes a time period for message processing, a time uncertainty for downlink and uplink Radio Resource Control (RRC) message delivery over control channel, and a time uncertainty for the terminal to perform a measurement, and wherein the uplink message transmission time indicates a time period for receiving a response from the terminal; and
   calculating the size limit of assistance data based on the response time, the measurement time, the protect margin time, the uplink message transmission time, and the data rate corresponding to the channel.

5. The method of claim 2, wherein the first size threshold indicates a predetermined threshold for assistance data size required for the first positioning solution.

6. The method of claim 5, wherein the second size threshold indicates a predetermined threshold for assistance data size required for the second positioning solution, and
   wherein the second positioning solution requires less amount of assistance data than the first positioning solution.

7. The method of claim 6, further comprising:
   in response to determining the size limit of assistance data being less than the second size threshold, selecting the second positioning solution or a third positioning solution from the set of positioning solutions,
   wherein the third positioning solution requires no assistance data or less amount of assistance data than the second positioning solution.

8. The method of claim 1, wherein the selecting the first positioning solution or the second positioning solution from the set of positioning solutions for the terminal comprises:
   selecting the first positioning solution or the second positioning solution based on the size limit of assistance data and on a possibility of positioning failure.

9. The method of claim 8, wherein the selecting the first positioning solution or the second positioning solution based on the size limit of assistance data and on the possibility of positioning failure comprises:
   in response to determining the size limit of assistance data being greater than the first size threshold and further in response to determining a first possibility of positioning failure being not greater than a first possibility threshold, selecting the first positioning solution from the set of positioning solutions,
   wherein the first possibility of positioning failure indicates a possibility of failure of the first positioning solution.

10. The method of claim 9, further comprising:
    in response to determining the size limit of assistance data being not greater than the first size threshold and not less than the second size threshold, and further in response to determining a second possibility of positioning failure being not greater than a second possibility threshold, selecting the second positioning solution from the set of positioning solutions, wherein the second possibility of positioning failure indicates a possibility of failure of the second positioning solution.

11. The method of claim 10, further comprising:
in response to determining the size limit of assistance data being less than the second size threshold, or
in response to determining the possibility of the first possibility of positioning failure being greater than the first possibility threshold, or
in response to determining the possibility of the second possibility of positioning failure being greater than the second possibility threshold, or
in response to determining the size limit of assistance data being greater than the first size threshold and further in response to determining the second possibility of positioning failure being not greater than the second possibility threshold, or
in response to determining the size limit of assistance data being not greater than the first size threshold and not less than the second size threshold, and further in response to determining the first possibility of positioning failure being not greater than the first possibility threshold,
selecting the second positioning solution or a third positioning solution from the set of positioning solutions, wherein the third positioning solution requires no assistance data.

12. An apparatus for selecting a positioning solution, the apparatus comprising:
a set of one or more processors; and
a non-transitory machine-readable storage medium containing code, which when executed by the set of one or more processors, causes the apparatus to:
receive information of a channel allocated to a terminal for wireless communication with the terminal, wherein the information pertains to a data transfer characteristic of the channel;
determine a size limit of assistance data that can be transmitted over the channel, based on the information of the channel; and
select a first positioning solution from a set of positioning solutions, when the size limit of assistance data determined for the channel is greater than a first size threshold and select a second positioning solution from the set of positioning solutions, when the size limit of assistance date is not greater than the first size threshold, but is not less than a second size threshold;
wherein the first positioning solution is mobile station (MS) based Assisted Global Positioning System (AGPS) solution and the second positioning solution is MS-assisted AGPS solution.

13. The apparatus of claim 12, wherein the non-transitory machine-readable storage medium further contains code, which when executed by the set of one or more processors, causes the apparatus to:
calculate the size limit of assistance data based on the information of the channel; and
select the first positioning solution or the second positioning solution based on comparing the size limit of assistance data calculated to size thresholds.

14. The apparatus of claim 13, wherein the non-transitory machine-readable storage medium further contains code, which when executed by the set of one or more processors, causes the apparatus to:
obtain a response time, a measurement time, and a data rate corresponding to the channel, wherein the response time indicates a time period for the terminal to make a response, the measurement time indicates a time period for the terminal to perform a measurement, and the data rate corresponding to the channel is obtained from the data transfer characteristic; and
calculate a size limit of assistance data based on the response time, the measurement time and the data rate corresponding to the channel.

15. The apparatus of claim 14, wherein the non-transitory machine-readable storage medium further contains code, which when executed by the set of one or more processors, causes the apparatus to:
obtain protect margin time and uplink message transmission time, wherein the protect margin time includes a time period for message processing, a time uncertainty for downlink and uplink Radio Resource Control (RRC) message delivery over a control channel, and a time uncertainty for the terminal to perform a measurement, and wherein the uplink message transmission time indicates a time period for receiving a response from the terminal; and
calculate the size limit of assistance data based on the response time, the measurement time, the protect margin time, the uplink message transmission time, and the data rate corresponding to the channel.

16. The apparatus of claim 13, wherein the first size threshold indicates a predetermined threshold for assistance data size requited for the first positioning solution.

17. The apparatus of claim 16, wherein the second size threshold indicates a predetermined threshold for assistance data size required for the second positioning solution, and wherein the second positioning solution requires less amount of assistance data than the first positioning solution.

18. The apparatus of claim 12, wherein the non-transitory machine-readable storage medium further contains code, which when executed by the set of one or more processors, causes the apparatus to:
select the first positioning solution or the second positioning solution based on the size limit of assistance data and on a possibility of positioning failure.

19. The apparatus of claim 18, wherein the non-transitory machine-readable storage medium further contains code, which when executed by the set of one or more processors, causes the apparatus to:
in response to determining the size limit of assistance data being greater than the first size threshold and further in response to determining a first possibility of positioning failure being not greater than a first possibility threshold, select the first positioning solution from the set of positioning solutions,
wherein the first possibility of positioning failure indicates a possibility of failure of the first positioning solution.

20. The apparatus of claim 19, wherein the non-transitory machine-readable storage medium further contains code, which when executed by the set of one or more processors, causes the apparatus to:
in response to determining the size limit of assistance data being not greater than the first size threshold and not less than the second size threshold, and further in response to determining-t, a second possibility of positioning failure being no greater than a second possibility threshold, select the second positioning solution from the set of positioning solutions,
wherein the second possibility of positioning failure indicates4 w a possibility of failure of the second positioning solution.

21. A location server for selecting a positioning solution, the location server comprising:
- a processor; and
- a non-transitory computer-readable medium having computer instructions stored therein, which when executed by the processor, cause the location server to perform operations comprising:
- receiving information of a channel allocated to a terminal for wireless communication with the terminal, wherein the information pertains to a data transfer characteristic of the channel;
- determining a size limit of assistance data that can be transmitted over the channel, based on the information of the channel; and
- selecting a first positioning solution4 from a set of positioning solutions, when the size limit of assistance data determined for the channel is greater than a first size threshold and selecting a second positioning solution from the set of positioning solutions, when the size limit of assistance data is not greater than the first size threshold, but is not less than a second size threshold,
- wherein the first positioning solution is mobile station (MS) based Assisted Global Positioning System (AGPS) solution and the second positioning solution is MS-assisted AGPS solution.

22. An apparatus for use in terminal positioning, the apparatus comprising:
- a set of one or more processors; and
- a non-transitory machine-readable storage medium containing code, which when executed by the set of one or more processors, causes the apparatus to:
- transmit to a location server, information of a channel allocated to a terminal for wireless communication with the terminal, wherein the information pertains to a data transfer characteristic of the channel and
- in response to the location server determining a size limit of assistance data that can be transmitted over the channel, based on the information of the channel, and in response to the location server selecting a first positioning solution from a set of positioning solutions, when the size limit of assistance data determined for the channel is greater than a first size threshold and selecting a second positioning solution from the set of positioning solutions, when the size limit of assistance data is not greater than the first size threshold, but is not less than a second size threshold, notifying the terminal the selected positioning solution,
- wherein the first positioning solution is mobile station (MS) based Assisted Global Positioning System (AGPS) solution and the second positioning solution is MS-assisted AGPS solution.

23. An apparatus for use in positioning of a terminal, the apparatus comprising:
- a set of one or more processors; and
- a non-transitory machine-readable storage medium containing code, which when executed by the set of one or more processors, causes the apparatus to:
- receive, from a base station controller, notification of a first positioning solution or a second positioning solution selected by a location server based on information of a channel allocated to the terminal for wireless communication with the terminal, wherein the information pertains to a data transfer characteristic of the channel, and wherein the location server determines a size limit of assistance data that can be transmitted over the channel, based on the information of the channel, and selects the first positioning solution from a set of positioning solutions, when the size limit of assistance data determined for the channel is greater than a first size threshold and selects a second positioning solution from the set of positioning solutions, when limit of assistance data is not greater than the first size threshold, but is not less than a second size threshold,
- wherein the first positioning solution is mobile station (MS) based Assisted Global Positioning System (AGPS) solution and the second positioning solution is MS-assisted AGPS solution; and
- position the terminal according to the selected first positioning solution or the second positioning solution.

* * * * *